(12) United States Patent
Hsiao et al.

(10) Patent No.: US 8,922,725 B2
(45) Date of Patent: Dec. 30, 2014

(54) 3D IMAGE SYSTEM AND 3D GLASSES

(75) Inventors: Chia-Chiang Hsiao, Shenzhen (CN);
Chih-Wen Chen, Shenzhen (CN);
Chengming He, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 339 days.

(21) Appl. No.: 13/379,229

(22) PCT Filed: Nov. 9, 2011

(86) PCT No.: PCT/CN2011/081972
§ 371 (c)(1),
(2), (4) Date: Dec. 19, 2011

(87) PCT Pub. No.: WO2013/067691
PCT Pub. Date: May 16, 2013

(65) Prior Publication Data
US 2013/0114006 A1    May 9, 2013

(30) Foreign Application Priority Data
Nov. 7, 2011   (CN) ...................... 2011 2 0434260 U

(51) Int. Cl.
*G02F 1/1335* (2006.01)
*G02B 27/22* (2006.01)
*H04N 13/04* (2006.01)
*G02B 27/26* (2006.01)

(52) U.S. Cl.
CPC ............ *G02B 27/26* (2013.01); *H04N 13/0434* (2013.01)
USPC .................. 349/15; 348/53; 348/58; 359/466

(58) Field of Classification Search
CPC .... G02B 27/22; G02B 27/26; H04N 13/0434; H04N 13/0438
USPC .................. 349/13, 15, 117, 119; 348/53, 58; 359/466
See application file for complete search history.

(56) References Cited

U.S. PATENT DOCUMENTS

| | | | |
|---|---|---|---|
| 4,884,876 A * | 12/1989 | Lipton et al. ..................... 349/33 |
| 6,222,672 B1 * | 4/2001 | Towler et al. ................. 359/465 |
| 2007/0081264 A1 * | 4/2007 | Hara et al. ..................... 359/885 |
| 2009/0189976 A1 * | 7/2009 | Morozov ........................ 348/53 |

* cited by examiner

*Primary Examiner* — Michael Caley

(57) ABSTRACT

Disclosed are a 3D image system and 3D glasses. The 3D image system includes a liquid crystal display monitor and the 3D glasses. The liquid crystal display monitor includes a backlight module and a ½λ wave plate. The ½λ wave plate converts lights from by the backlight module into linear polarized lights. The 3D glasses includes a first ¼λ wave plate for receiving and converting the linear polarized lights from the ½λ wave plate into circular polarized lights, a second ¼λ wave plate for converting the circular polarized lights from the first ¼λ wave plate into linear polarized lights, and a second ¼λ wave plate for filtering the linear polarized lights from the second ¼λ wave plate and transmitting the filtered lights to left and right eyes correspondingly. The present invention saves the cost and decreases the maintaining expense.

8 Claims, 2 Drawing Sheets

3D IMAGE SYSTEM AND 3D GLASSES

BACKGROUND OF THE INVENTION

1. Field of the Invention

The present invention generally relates to a 3D display technology field, and more particularly to a 3D image system and 3D glasses.

2. Description of Prior Art

With the progressive development of 3D display technology, user requirements for the quality of 3D display are getting higher and higher.

Please refer to FIG. 1, in a conventional 3D image system, a liquid crystal display monitor comprises a monitor 11 and further comprises a ½λ wave plate 12, a ¼λ wave plate 13, and a polarizer 14. The ½λ wave plate 12 and the ¼λ wave plate 13 constitute a retarder. The ½λ wave plate 12 and the ¼λ wave plate 13 are a type of optical device, which is capable of enabling two lights perpendicular to one another to produce a phase difference during vibrations. The ½λ wave plate 12 and the ¼λ wave plate 13 are usually made of a birefringence crystal having an accurate thickness, such as quartz, calcite, or mica, and axes of the ½λ wave plate 12 and the ¼λ wave plate 13 are parallel with a surface of the wave plates.

When a linear polarized light is vertically incident into a wave plate and an angle between a vibration direction thereof and an optical axis of the wave plate is θ (θ≠0), the incident light vibrates and is separated into two components which are perpendicular to the optical axis (ordinary vibration) and parallel with the optical axis (extraordinary vibration). The two components are corresponding to an ordinary light (o light) and an extraordinary light (e light) of the wave plate. The o light and e light of the wave plate propagate along the same direction but have different speeds (refractive indices are different). An optical path difference $(n_o-n_e)d$ is produced after the o light and e light pass through the wave plate, wherein d is a thickness of the wave plate, and $n_o$ and $n_e$ are the refractive indices of the o light and e light. A phase difference between the two perpendicular vibrations is $\Delta_j=2\pi(n_o-n_e)d/\lambda$. The two vibrations are generally synthesized to be an elliptical polarization. When $\Delta_j=2k\pi$ (k is an integer), the two vibrations are synthesized to be a linear polarized light; when $\Delta_j=(2k+1)\pi/2$ and θ=45 degrees, the two vibrations are synthesized to be a circular polarized light.

The ¼λ wave plate is a wave plate capable of enabling the o light and e light to produce an additional optical path difference of ¼λ. When a linear polarized light is incident into the ¼λ wave plate and θ=45 degrees, a light emitted from the wave plate is a circular polarized light. In contrast, after a circular polarized light passes through the ¼λ wave plate, the circular polarized light is converted into a linear polarized light.

The ½λ wave plate is a wave plate capable of enabling the o light and e-light to produce an additional optical path difference of ½λ. After a linear polarized light passes through the ½λ wave plate, the light is still a linear polarized light but a vibration direction thereof is required to be converted by an angle.

The lights emitted from the monitor 11 propagate along a dotted line L, and the lights emitted from the monitor 11 are converted to be linear polarized lights by the polarizer 14. After the polarized lights pass through the retarder constituted by the ¼λ wave plate 13 and the ½λ wave plate 12, circular polarized lights comprising left-circular polarized lights and right-circular polarized lights which are perpendicular to one another are formed. Then, left-eye and right-eye images are transmitted to the corresponding eyes after filtering by circular polarized 3D glasses (not shown).

Since the area of the monitor of the liquid crystal display is larger, more particularly the monitor of the large-size liquid crystal display, the large-area ¼λ wave plate 13 is required and thus the manufacturing cost and maintaining cost are higher.

SUMMARY OF THE INVENTION

An objective of the present invention is to provide a 3D image system to solve the technical problem that since the area of the monitor of the liquid crystal display is larger in the prior arts, more particularly the monitor of the large-size liquid crystal display, the large-area ¼λ wave plate is required and thus the manufacturing cost and maintaining cost are increased.

To solve the above-mentioned problem, the present invention provides a 3D image system. The 3D image system comprises a liquid crystal display monitor and 3D glasses. The liquid crystal display monitor comprises a backlight module and a ½λ wave plate. The ½λ wave plate is utilized for converting lights emitted by the backlight module into linear polarized lights.

The 3D glasses comprise a first ¼λ wave plate for receiving the linear polarized lights emitted by the ½λ wave plate and converting the linear polarized lights into circular polarized lights, a second ¼λ wave plate for converting the circular polarized lights emitted by the first ¼λ wave plate into linear polarized lights, and a linear polarizer for filtering the linear polarized lights emitted by the second ¼λ wave plate and transmitting the filtered lights to left and right eyes correspondingly.

The second ¼λ wave plate is disposed between the first ¼λ wave plate and the linear polarizer. A slow axis of the first ¼λ wave plate is parallel with a slow axis of the ½λ wave plate, and a thickness of the first ¼λ wave plate is ranged from 0.1 mm to 0.3 mm.

In the 3D image system of the present invention, an angle between a slow axis of the second ¼λ wave plate and the slow axis of the first ¼λ wave plate is 45 degrees.

In the 3D image system of the present invention, an angle between a polarization axis of the linear polarizer and the slow axis of the second ¼λ wave plate is 45 degrees, and an angle between the polarization axis of the linear polarizer and the slow axis of the first ¼λ wave plate is 90 degrees.

Another objective of the present invention is to provide a 3D image system to solve the technical problem that since the area of the monitor of the liquid crystal display is larger in the prior arts, more particularly the monitor of the large-size liquid crystal display, the large-area ¼λ wave plate is required and thus the manufacturing cost and maintaining cost are increased.

To solve the above-mentioned problem, the present invention provides a 3D image system. The 3D image system comprises a liquid crystal display monitor and 3D glasses. The liquid crystal display monitor comprises a backlight module and a ½λ wave plate. The ½λ wave plate is utilized for converting lights emitted by the backlight module into linear polarized lights.

The 3D glasses comprise a first ¼λ wave plate for receiving the linear polarized lights emitted by the ½λ wave plate and converting the linear polarized lights into circular polarized lights, a second ¼λ wave plate for converting the circular polarized lights emitted by the first ¼λ wave plate into linear polarized lights, and a linear polarizer for filtering the linear polarized lights emitted by the second ¼λ wave plate and transmitting the filtered lights to left and right eyes correspondingly. The second ¼λ wave plate is disposed between the first ¼λ wave plate and the linear polarizer.

In the 3D image system of the present invention, a slow axis of the first ¼λ wave plate is parallel with a slow axis of the ½λ wave plate.

In the 3D image system of the present invention, an angle between a slow axis of the second ¼λ wave plate and the slow axis of the first ¼λ wave plate is 45 degrees.

In the 3D image system of the present invention, an angle between a polarization axis of the linear polarizer and the slow axis of the second ¼λ wave plate is 45 degrees, and an angle between the polarization axis of the linear polarizer and the slow axis of the first ¼λ wave plate is 90 degrees.

In the 3D image system of the present invention, a thickness of the first ¼λ wave plate is ranged from 0.1 mm to 0.3 mm.

Another objective of the present invention is to provide 3D glasses to solve the technical problem that since the area of the monitor of the liquid crystal display is larger in the prior arts, more particularly the monitor of the large-size liquid crystal display, the large-area ¼λ wave plate is required and thus the manufacturing cost and maintaining cost are increased.

To solve the above-mentioned problem, the present invention provides 3D glasses. The 3D glasses comprises a first ¼λ wave plate for converting linear polarized lights into circular polarized lights, a second ¼λ wave plate for converting the circular polarized lights emitted by the first ¼λ wave plate into linear polarized lights, and a linear polarizer for filtering the linear polarized lights emitted by the second ¼λ wave plate and transmitting the filtered lights to left and right eyes correspondingly. The second ¼λ wave plate is disposed between the first ¼λ wave plate and the linear polarizer.

In the glasses of the present invention, a slow axis of the first ¼λ wave plate is parallel with a slow axis of the ½λ wave plate.

In the glasses of the present invention, an angle between a slow axis of the second ¼λ wave plate and the slow axis of the first ¼λ wave plate is 45 degrees.

In the glasses of the present invention, an angle between a polarization axis of the linear polarizer and the slow axis of the second the ¼λ wave plate is 45 degrees, and the polarization axis of the linear polarizer and the slow axis of the first ¼λ wave plate is 90 degrees.

In the glasses of the present invention, a thickness of the first ¼λ wave plate is ranged from 0.1 mm to 0.3 mm.

Comparing with the prior arts, the present invention solves the technical problem that since the area of the monitor of the liquid crystal display is larger in the prior arts, more particularly the monitor of the large-size liquid crystal display, the large-area ¼λ wave plate is required and thus the manufacturing cost and maintaining cost are increased.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures.

Figure 1:
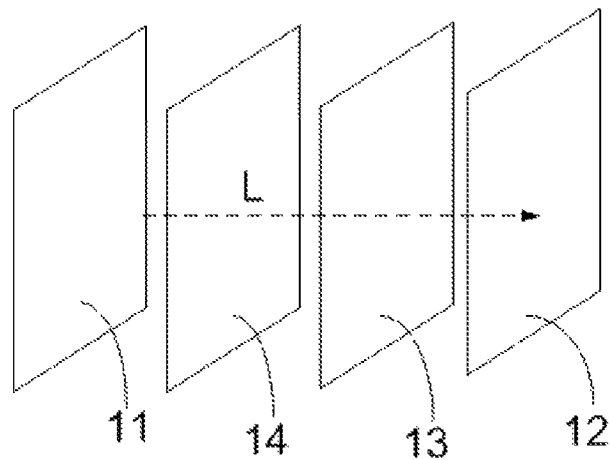
FIG. 1 shows an exploded view of a liquid crystal display of a 3D image system in the prior arts.
Figure 2:
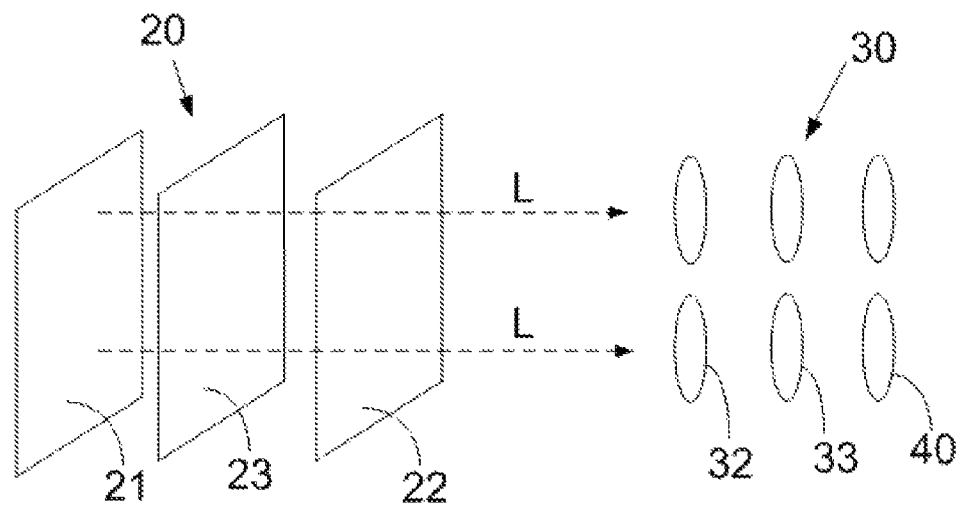
FIG. 2 shows an exploded view of a preferable embodiment of a 3D image system according to the present invention.

Please refer to FIG. 2, which shows an exploded view of a preferable embodiment of a 3D image system according to the present invention. The 3D image system comprises a liquid crystal display monitor 20 and 3D glasses 30. The liquid crystal display monitor 20 comprises a backlight module (not shown), a liquid crystal panel 21, a polarizer 23, and a ½λ wave plate 22. The polarizer 23 and the ½λ wave plate 22 are sequentially disposed at outside of the liquid crystal panel 21. Lights emitted by the backlight module propagate along dotted lines L. After the lights pass through the liquid crystal panel 21 and the polarizer 23, the lights are converted into linear polarized lights and then enter the ½λ wave plate 22. After the linear polarized lights pass through the ½λ wave plate 22, two types of linear polarized lights which are perpendicular to one another are formed.

Figure 3:
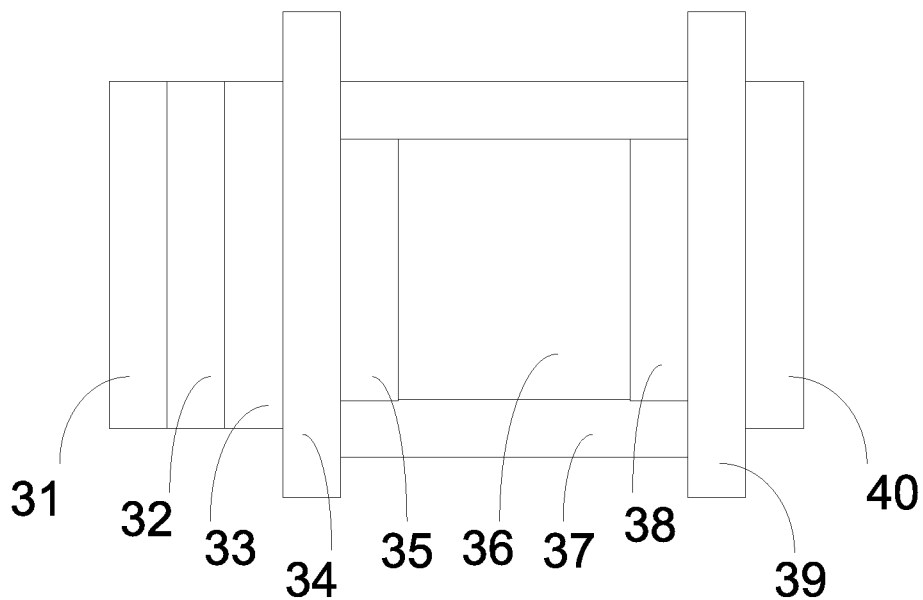
FIG. 3 shows a structural diagram of 3D glasses according to the present invention.

Please refer to FIG. 2 with FIG. 3, the 3D glasses comprise a protective film 31, a first ¼λ wave plate 32, a second ¼λ wave plate 33, a first glass substrate 34, a first transparent conductive film 35, liquid crystals 36, a sealant 37, a second transparent conductive film 38, a second glass substrate 39, and a linear polarizer 40.

The liquid crystals 36 between the first glass substrate 34 and the second glass substrate 39 are sealed by the sealant 37. The first transparent conductive film 35 is disposed at a side of the first glass substrate 34 near the liquid crystals 36, while the second transparent conductive film 38 is disposed at a side of the second glass substrate 39 near the liquid crystals 36. The second ¼λ wave plate 33 is disposed between the first ¼λ wave plate 32 and the first glass substrate 34.

Figure 4:
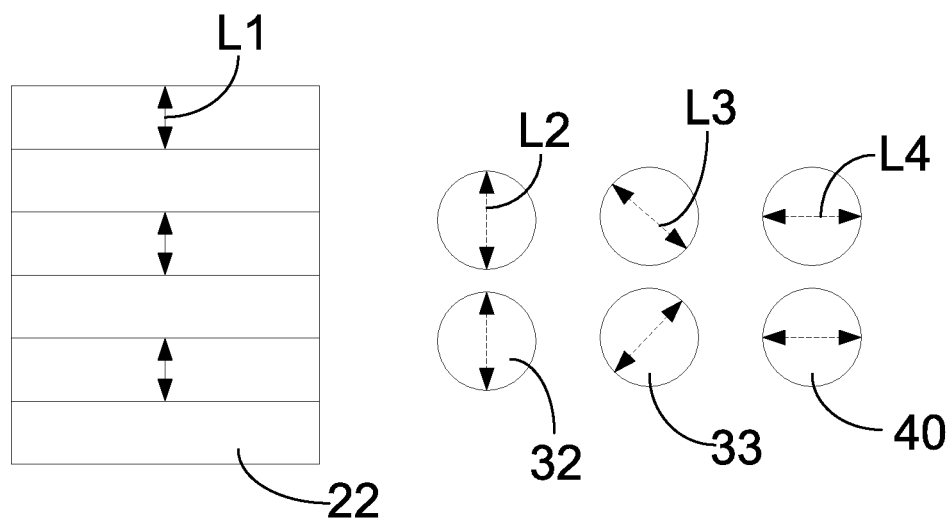
FIG. 4 shows a front view of a preferred embodiment comprising a polarizer and wave plates according to the present invention.

Please refer to FIG. 2 and FIG. 3 in conjunction with FIG. 4, the first ¼λ wave plate 32 is utilized for receiving the two types of linear polarized lights which are perpendicular with one another and emitted from the ½λ wave plate 22 of the liquid crystal display monitor 20. A slow axis L2 of the first ¼λ wave plate 32 is parallel with a slow axis L1 of the ½λ wave plate 22. Accordingly, angles between the slow axis L2 of the first ¼λ wave plate 32 and the two types of linear polarized lights which are perpendicular with one another and emitted from the ½λ wave plate 22 are 45 degrees. Accordingly, the two types of linear polarized lights which are perpendicular to one another are converted into left-circular polarized lights and right-circular polarized lights after passing the first ¼λ wave plate 32. Preferredly, a thickness of the first ¼λ wave plate 32 is ranged from 0.1 mm to 0.3 mm.

The second ¼λ wave plate 33 is utilized for converting the circular polarized lights emitted by the first ¼λ wave plate 32 into linear polarized lights. The linear polarizer 40 is utilized for filtering the linear polarized lights and transmitting the filtered lights to a left eye and a right eye correspondingly.

Please refer to FIG. 2 and FIG. 3 in conjunction with FIG. 4, an angle between a slow axis L3 of the second ¼λ wave plate 33 and the slow axis L2 of the first ¼λ wave plate 32 is 45 degrees. Certainly, as long as the second ¼λ wave plate 33 can convert the circular polarized lights emitted by the first ¼λ wave plate 32 into the linear polarized lights, the angle can be any other angle and thus is not recited in detail.

Please refer to FIG. 2 and FIG. 3 in conjunction with FIG. 4, an angle between a polarization axis L4 of the linear polarizer 40 and the slow axis L3 of the second ¼λ wave plate 33 is 45 degrees, and an angle between the polarization axis L4 of the linear polarizer 40 and the slow axis L2 of the first ¼λ wave plate 32 is 90 degrees. Certainly, as long as the polarizer 40 can filter the linear polarized lights emitted by the second ¼λ wave plate 33 and transmit the filter light to the left eye and right eye correspondingly, the angle can be any other angle and thus is not recited in detail.

The following is an operational principle of the preferable embodiment of the 3D image system according to the present invention.

Please refer to FIG. 2, FIG. 3 and FIG. 4, when viewing 3D images, the lights emitted from the backlight module are converted into the linear polarized lights after passing through the liquid crystal panel 21 and the polarizer 23. Then, the two types of linear polarized lights which are perpendicular to one another are formed after the linear polarized lights pass through the ½λ wave plate 22.

When a user wears the 3D glasses 30, the linear polarized lights emitted from the ½λ wave plate 22 firstly enter the first ¼λ wave plate 32. Since the slow axis L2 of the first ¼λ wave plate 32 is parallel with the slow axis L1 of the ½λ wave plate 22, angles between the slow axis L2 of the first ¼λ wave plate 32 and the two types of linear polarized lights which are perpendicular to one another and emitted from the ½λ wave plate 22 are 45 degrees. Accordingly, the two types of linear polarized lights perpendicular to one another are converted into the left-circular polarized light and the right-circular polarized light after passing the first ¼λ wave plate 32.

The circular polarized lights converted by the first ¼λ wave plate 32 pass through the second ¼λ wave plate 33. The angles between the slow axis L3 of the second ¼λ wave plate 33 and both the slow axis L2 of the first ¼λ wave plate 32 and the polarization axis L4 of the linear polarizer 40 are 45 degrees. The second ¼λ wave plate 33 converts the circular polarized lights emitted by the first ¼λ wave plate 32 into the linear polarized lights. The linear polarized lights emitted from the second ¼λ wave plate 33 pass through the first glass substrate 34, the first transparent conductive film 35, the liquid crystals 36, the second transparent conductive film 38, and the second glass substrate 39 and enter the linear polarizer 40. The polarization axis L4 of the linear polarizer 40 is perpendicular to the slow axis L2 of the first ¼λ wave plate 32. The linear polarizer 40 filters the entered linear polarized lights and transmits the left-eye and right-eye images to the left and right eyes correspondingly.

The present invention further provides the 3D glasses. Please refer to FIG. 2, FIG. 3, and FIG. 4. The 3D glasses 30 comprise the protective film 31, the first ¼λ wave plate 32, the second ¼λ wave plate 33, the first glass substrate 34, the first transparent conductive film 35, the liquid crystals 36, the sealant 37, the second transparent conductive film 38, the second glass substrate 39, and the linear polarizer 40.

The liquid crystals 36 between the first glass substrate 34 and the second glass substrate 39 are sealed by the sealant 37. The first transparent conductive film 35 is disposed at a side of the first glass substrate 34 near the liquid crystals 36, while the second transparent conductive film 38 is disposed at a side of the second glass substrate 39 near the liquid crystals 36. The second ¼λ wave plate 33 is disposed between the first ¼λ wave plate 32 and the first glass substrate 34.

Preferredly, the thickness of the first ¼λ wave plate 32 is ranged from 0.1 mm to 0.3 mm.

Preferredly, the slow axis L2 of the first ¼λ wave plate 32 is parallel with the slow axis L1 of the ½λ wave plate 22.

Certainly, as long as the first ¼λ wave plate 32 can convert the linear polarized lights emitted by the ½λ wave plate 22 into the circular polarized lights, the angle can be any other angle and thus is not recited in detail.

Preferredly, the angle between the slow axis L3 of the second ¼λ wave plate 33 and the slow axis L2 of the first ¼λ wave plate 32 is 45 degrees. Certainly, as long as the second ¼λ wave plate 33 can convert the circular polarized lights emitted by the first ¼λ wave plate 32 into the linear polarized lights, the angle can be any other angle and thus is not recited in detail.

Preferredly, the angle between the polarization axis L4 of the linear polarizer 40 and the slow axis L3 of the second ¼λ wave plate 33 is 45 degrees, and the angle between the polarization axis L4 of the linear polarizer 40 and the slow axis L2 of the first ¼λ wave plate 32 is 90 degrees. Certainly, as long as the polarizer 40 can filter the linear polarized lights emitted by the second ¼λ wave plate 33 and transmit the filtered lights to the left and right eyes correspondingly, the angle can be any other angle and thus is not recited in detail.

Obviously, comparing with the large-area ¼λ wave plate disposed at a side of the liquid crystal panel in the prior arts, the embodiment of the present invention shows the 3D effect by disposing the small-area first ¼λ wave plate 32 in coordination with the second ¼λ wave plate 33 and the linear polarizer 40. The manufacturing cost is saved greatly and the maintaining cost is decreased, and it is beneficial to popularize the 3D image system.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A 3D image system, the 3D image system comprising a liquid crystal display monitor and 3D glasses, characterized in that the liquid crystal display monitor comprises a backlight module and a ½λ wave plate, the ½λ wave plate is utilized for converting lights emitted by the backlight module into linear polarized lights;

the 3D glasses comprise a first ¼λ wave plate for receiving the linear polarized lights emitted by the ½λ wave plate and converting the linear polarized lights into circular polarized lights, a second ¼λ wave plate for converting the circular polarized lights emitted by the first ¼λ wave plate into linear polarized lights, and a linear polarizer for filtering the linear polarized lights emitted by the second ¼λ wave plate and transmitting the filtered lights to left and right eyes correspondingly;

wherein the second ¼λ wave plate is disposed between the first ¼λ wave plate and the linear polarizer, a slow axis of the first ¼λ wave plate is parallel with a slow axis of the ½λ wave plate, and a thickness of the first ¼λ wave plate is ranged from 0.1 mm to 0.3 mm.

2. The 3D image system of claim 1, characterized in that an angle between a slow axis of the second ¼λ wave plate and the slow axis of the first ¼λ wave plate is 45 degrees.

3. The 3D image system of claim 2, characterized in that an angle between a polarization axis of the linear polarizer and the slow axis of the second ¼λ wave plate is 45 degrees, and an angle between the polarization axis of the linear polarizer and the slow axis of the first ¼λ wave plate is 90 degrees.

4. A 3D image system, the 3D image system comprising a liquid crystal display monitor and 3D glasses, characterized in that the liquid crystal display monitor comprises a backlight module and a ½λ wave plate, the ½λ wave plate is utilised for converting lights emitted by the backlight module into linear polarized lights;

the 3D glasses comprise a first ¼λ wave plate for receiving the linear polarized lights emitted by the ½λ wave plate and converting the linear polarized lights into circular polarized lights, a second ¼λ wave plate for converting the circular polarized lights emitted by the first ¼λ wave plate into linear polarized lights, and a linear polarizer for filtering the linear polarized lights emitted by the second ¼λ wave plate and transmitting the filtered lights to left and right eyes correspondingly;

wherein the second ¼λ wave plate is disposed between the first ¼λ wave plate and the linear polarizer.

5. The 3D image system of claim 4, characterized in that a slow axis of the first ¼λ wave plate is parallel with a slow axis of the ½λ wave plate.

6. The 3D image system of claim 5, characterized in that an angle between a slow axis of the second ¼λ wave plate and the slow axis of the first ¼λ wave plate is 45 degrees.

7. The 3D image system of claim 5, characterized in that an angle between a polarization axis of the linear polarizer and a slow axis of the second ¼λ wave plate is 45 degrees, and an angle between the polarization axis of the linear polarizer and the slow axis of the first ¼λ wave plate is 90 degrees.

8. The 3D image system of claim 4, characterized in that a thickness of the first ¼λ wave plate is ranged from 0.1 mm to 0.3 mm.

\* \* \* \* \*